United States Patent Office 3,206,398
Patented Sept. 14, 1965

3,206,398
METHODS AND COMPOSITIONS FOR IMPROVING SECONDARY RECOVERY OF OIL
Bernard Marlowe, Broomall, Pa., Richard L. Raymond, Wilmington, Del., and John D. Douros, Jr., West Chester, Pa., assignors to Sun Oil Company, Philadelphia, Pa., a corporation of New Jersey
No Drawing. Filed Jan. 15, 1962, Ser. No. 166,381
7 Claims. (Cl. 252—8.55)

This invention relates to microorganism growth-inhibitors added to secondary recovery flood waters to increase oil recovery.

More particularly this invention concerns the use of flood water additives which inhibit the growth of microorganisms that otherwise would cause plugging of the formation sand faces and induce corrosion.

These additives are di-substituted naphthalenes of the structures:

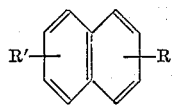

wherein R and R', which may be the same or different, are substituents selected from the group consisting of hydroxy, hydroxyalkyl, carboxy, the corresponding oxides and carboxy salts. Hydroxyalkyl and carboxy as used herein means radicals having from 1 to 6 carbon atoms, branched or unbranched, joined or conjoined.

The term "flood water" as used in this disclosure is any water artificially put into contact with oil-bearing formations, by any means, to effect secondary recovery of oil. The water used may be of any source or quality, ranging from spring water, to brackish water or brine or any of these waters recycled for economy of operation.

Examples of the additives employed according to this invention include among others:

1,2-dihydroxynaphthalene
1,3-dihydroxynaphthalene
1,6-dihydroxynaphthalene
1,7-dihydroxynaphthalene
2,6-dihydroxynaphthalene
1,8-dihydroxynaphthalene
2-hydroxy-1-naphthoic acid
3-hydroxy-1-naphthoic acid
6-hydroxy-1-naphthoic acid
7-hydroxy-1-naphthoic acid
8-hydroxy-1-naphthoic acid
1-hydroxy-2-naphthoic acid
6-hydroxy-2-naphthoic acid
7-hydroxy-2-naphthoic acid
6-hydroxymethyl-2-naphthoic acid as well as their mono- and di-salts.

As is well known in the art, a secondary recovery operation can only be successful where the value of the additional oil recovered from the reservoir exceeds the total cost of the flooding operation.

One of the problems which reduces the profit margins in secondary recovery operations is the growth of microorganisms in the flood waters. These microorganisms may be roughly classified as consisting of the protozoa, the algae, the fungi, and the bacteria. Of these four classes, only the protozoa are comparatively harmless to water flood operations. The algae being plants require sunlight and may be rather easily controlled by excluding light and using biocides such as copper sulfate to kill them. However, fungi and bacteria are much more adaptable to environmental conditions and are more recalcitrant to chemical treatment than the algae. Unfortunately, these fungi and bacteria impair the flow of the well by clogging up parts such as the filters in the water injection system, pipes and equipment. More important these microorganisms clog the sand face pores preventing the flow of the oil out of the well.

Among the many troublesome microorganisms both aerobic and anaerobic encountered, are the bacterial genera Sphaerotilus, Gallionella, Desulfovibrio, Clostridium, Beggiatoa, Thiobacillus, Serratia, Pseudomonas, as well as the fungi and various unclassified yeasts.

Not only do these microorganisms prevent or reduce the oil recovery per se but in addition they increase and accelerate corrosion, some through the production of hydrogen sulfide and others through mechanisms largely unknown.

Whatever be their mechanism of interfering with flood water operations, these microorganisms are the direct and indirect cause of millions of dollars loss annually in the petroleum industry. While there is no shortage of fungicides and bactericides that are effective against either specific bacteria or fungi or against bacteria or fungi as a class, few microorganism inhibitors are available which have a broad spectrum of activity against many different bacteria, fungi and yeasts, in their flood water environment and yet are low in cost, and are effective at low concentrations. Additional difficulties which prevent the use of ordinary biocides is that the microorganisms acquire resistance to the generally used inhibitors and that large quantities of salts and impurities present in flood water may chelate, precipitate or otherwise render the inhibitor ineffective. Thus, because of the foregoing special problems, the selection of an effective inhibitor must remain basically an empirical operation even though in the laboratory the inhibitor functions satisfactorily.

It was therefore most surprising to discover that the above-described di-substituted naphthalene derivatives and salts are effective against a broad spectrum of microorganisms including fungi, bacteria, yeasts and algae, at low concentrations of inhibitor and under unfavorable control conditions.

Yet another advantageous factor in the choice of applicants' inhibitors is their availability, low cost and ease of preparation. All of the mono- and dihydroxy, hydroxyalkyl and carboxy naphthalenes are well known compounds whose preparation and properties are presented among other places in Chemical Abstracts or in the exhaustive review by Donaldson, entitled, "The Chemistry and Technology of Naphthalene Compounds," published by London, E. Arnold, 1958. Most of the salts are well known or are prepared by adding a slight excess over the stoichiometric amount of the base in water, ethanol or acetone, to a solution of the acid- or hydroxynaphthalene in water, ethanol, acetone or a mixture of these solvents.

An addtional advantage of the present inhibitors is their favorable water solubility which may be increased by either using or making the appropriate salt. For while all of the disclosed compositions repress or control the growth of microorganisms, as in any large group of compositions, aside from activity per se, certain characteristics such as cost, ease of preparation, commercial availability and physical characteristics, determine which composition or group of compositions are to be preferred for a particular use over other compositions or the group as a whole. In this instance, water solubility, high activity, a broad activity spectrum and low cost are especially important in view of the many varieties of microorganisms encountered and the huge amounts of inhibitor required for microorganism control.

For practically all of these secondary recovery purposes, a microorganism inhibitor which possesses at least slight solubility in water is needed so that the chemical can enter the environment of the microorganisms encountered in the flood waters and remain in contact with them sufficiently long to inhibit, kill or repress them. For this purpose it appears broadly as though the dihydroxynaphthalenes, the dinaphthoic acids and the hydroxynaphthoic acids as well as their solubilizing salts are the preferred class of inhibitors for treating microorganisms found in flood waters of secondary recovery operations. Since the di-substituted naphthalene moiety, rather than the salt, seems to be the source of the compositions' microorganism-inhibiting effect, the nature of the salt seems to be immaterial as long as the salt is at least slightly soluble in water. Thus, all of the salts are considered to be equivalent for this microorganism growth-inhibiting purpose as long as they satisfy the solubility requirement. The following salts among others are believed to be satisfactory: the sodium, potassium, lithium, ammonium, as well as the substituted ammonium salts.

Examples of the substituted ammonium salts among many others are the mono-, di-, tri and tetraalkyl ammonium such as methyl ammonium, ethyl ammonium, amyl ammonium, decyl ammonium, stearyl ammonium, dimethyl-, diethyl-, dipropyl-, dibutyl-, diamyl-, dioctyl-, didecyl-, distearyl ammonium, trimethyl-, triethyl-, tripropyl-, tributyl-, triamyl-, trioctyl-, trilauryl ammonium, mono-, di- and tri-alkanol ammonium including mono-, di-, and triethanol ammonium, propanol ammonium, butanol ammonium, tetraalkyl ammonium, including tetramethyl ammonium, trimethyl-2-chloroethyl) ammonium, trimethyl-(2-hydroxyethyl) ammonium, also anilinium, N-methylanilinium, N,N-dimethylanilinium, pyridinium, N-lauryl pyridinium, N-cetylpyridinium, morpholinium, N-methyl morpholinium, piperazinium, benzyl ammonium, cyclohexyl ammonium, hydrazinium, hydroxyl amcyclohexyl ammonium, hydrazinium, hydroxyl ammonium, and the like. Occasionally, where the secondary recovery liquids contain recycled water containing residual hydrocarbons, the use of an oil-soluble inhibitor is desirable. In those instances, use of a hydroxyalkyl naphthalene is recommended.

Because of a great many variable factors involved, it is impractical to state with precision the concentration of inhibitor which should be used under all conditions. Some of these variables are the type of flood water utilized, the additives present, drilling practice, geological type of formation, the particular well being worked, as well as the resistance of the various microorganisms encountered. Sampling and checking the flood water and formation walls for types and quantities of microorganisms will be the best indication of how much inhibitor to use. However, it has been found that from 25–5000 p.p.m. of inhibitor represents the workable range with amounts beneath 25 p.p.m. being ineffective, and amounts in excess of 5000 p.p.m. being prohibitively expensive. The more average effective range would be 150–500 p.p.m. in actual practice.

The inhibitor may be added or applied by a variety of techniques and methods. These include periodically adding a high potency concentrate of the inhibitor undiluted or diluted with adjuvants such as emulsifiers, surface active agents, detergents, wetting agents, suspending agents and the like. More common practice is to produce a concentrate of the inhibitor undiluted or diluted as above and then to continually add this concentrate by injection or other means to the flood water at a rate which testing has established as a desirable concentration. This is ordinarily done prior to pumping the water containing inhibitor into the oil bearing subterranean formation.

To more fully set forth the detailed workings of this invention, the following non-limiting and illustrative example of this invention is submitted:

*Example I.—Evaluation of representative compositions of this invention as microorganism growth-inhibitors*

*Experimental.*—125 gallons of flood water taken from an oil well which had encountered microorganism induced plugging and fouling during actual secondary recovery operations, are divided into fifty 2½ gallon portions. Ten portions are untreated as controls while duplicate portions are treated with representative compounds of this invention in sufficient amount to produce duplicate treated samples having a concentration of 500 and 1000 p.p.m. (all of the materials, sampling and test procedures follow the recommended practice of A.P.I. RP 38: Recommended Practice for Biological Analysis of Water Flood Injection Waters, except that plates are read at the end of 10 days only, not 5 and 10 days). Within four hours after the samples are taken in duplicate, 1 ml. aliquots of the treated and untreated samples are used to inoculate standard nutrient agar plates. The plates are incubated under aeorbic conditions at 35° C., and after 10 days, the bacterial count is made. No algae were present so no examination was made for them.

*Results.*—The average bacterial count of the 10 untreated samples is 52,000/ml., the extreme values being 36,000/ml. and 66,000/ml. This, according to the American Petroleum Institute (A.P.I.) recommendations, is a relatively high value compared to the average minimum of 10,000 bacteria/ml. that may cause difficulty in a water flooding operation.

The following eleven compounds at 500 p.p.m. concentration brought the treated samples' bacterial count to 2500 bacteria/ml., which is considered to be an acceptable value:

1,2-dihydroxynaphthalene
1,8-dihydroxynaphthalene
2,6-dihydroxynaphthalene
2,6-dihydroxymethylnaphthalene
1,6-dihydroxynaphthalene
1,2-dicarboxynaphthalene, sodium salt
1-hydroxy-2-naphthoic acid, ammonium salt
8-hydroxy-1-naphthoic acid, dimethylamine salt
6-hydroxy-1-naphthoic acid, hydroxylammonium salt
2-hydroxy-1-naphthoic acid, diethanol ammonium salt
1,8-dicarboxynaphthalene, disodium salt The following compounds at 1000 p.p.m. concentration brought the bacterial count to 2500/ml. considered to be an acceptable figure:

1,7-dihydroxynaphthalene
2,6-dihydroxybutylnaphthalene
2,6-dicarboxynaphthalene, di-dimethylamine salt
1,3-dihydroxynaphthalene
1,4-dicarboxynaphthalene, ammonium salt
1,5-dicarboxynaphthalene, potassium salt

We claim:

1. In the process of secondary oil recovery characterized by the step of contacting flooding water with oil bearing subterranean formations to displace portions of the residual oil therein, the improvement comprising flooding the subterranean formations with water having incorporated therein a microorganism growth-inhibiting amount of a di-substituted naphthalene of the structure:

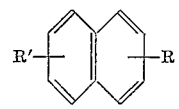

wherein R and R' are substituents selected from the group consisting of (1) hydroxy, (2) hydroxyalkyl, (3) carboxy and (4) the salts of carboxy, said hydroxyalkyl and carboxy substituents each having from 1 to 6 carbon atoms.

2. The process of claim 1 wherein the di-substituted naphthalene is 1,8-dihydroxynaphthalene.

3. The process of claim 1 wherein the di-substituted naphthalene is 2,6-dihydroxynaphthalene.

4. The process of claim 1 wherein the di-substituted naphthalene is the di-sodium salt of 1,2-dicarboxynaphthalene.

5. The process of claim 1 wherein the di-substituted naphthalene is the ammonium salt of 1-hydroxy-2-naphthoic acid.

6. The process of claim 1 wherein the di-substituted naphthalene is the dimethylamine salt of 6-hydroxy-1-naphthoic acid.

7. The process of claim 1 wherein the di-substituted naphthalene is the potassium salt of 6-hydroxymethyl-2-naphthoic acid.

References Cited by the Examiner

UNITED STATES PATENTS

| | | | |
|---|---|---|---|
| 2,867,279 | 1/59 | Cocks | 252—8.55 |
| 2,917,428 | 12/59 | Hitzman | 252—8.55 |
| 3,053,765 | 9/62 | Sparks | 252—8.55 |
| 3,117,909 | 1/64 | Douros et al. | 167—32 |

OTHER REFERENCES

Gregory: Uses and Applications of Chemicals and Related Materials, Reinhold Pub. Corp., June 1939, page 400.

JULIUS GREENWALD, *Primary Examiner*.